US012645798B2

(12) United States Patent　　　　(10) Patent No.:　US 12,645,798 B2
Boling et al.　　　　　　　　　　(45) Date of Patent:　　　Jun. 2, 2026

(54) SYSTEMS AND METHODS FOR ON-DEMAND LOADING OF METADATA

(71) Applicant: Dover Microsystems, Inc., Wayland, MA (US)

(72) Inventors: Eli Boling, Manchester, MA (US); Steven Milburn, Cranston, RI (US)

(73) Assignee: Dover Microsystems, Inc., Wayland, MA (US)

( * ) Notice: Subject to any disclaimer, the term of this patent is extended or adjusted under 35 U.S.C. 154(b) by 217 days.

(21) Appl. No.: 18/687,948

(22) PCT Filed: Sep. 2, 2022

(86) PCT No.: PCT/US2022/042492
§ 371 (c)(1),
(2) Date: Jul. 19, 2024

(87) PCT Pub. No.: WO2023/034586
PCT Pub. Date: Mar. 9, 2023

(65) Prior Publication Data
US 2024/0354412 A1　　Oct. 24, 2024

Related U.S. Application Data

(60) Provisional application No. 63/240,808, filed on Sep. 3, 2021.

(51) Int. Cl.
*G06F 21/56*　　　　　(2013.01)
(52) U.S. Cl.
CPC .................................. *G06F 21/566* (2013.01)

(58) Field of Classification Search
CPC ...... G06F 21/566; G06F 11/07; G06F 11/073; G06F 11/0793; G06F 9/3861;
(Continued)

(56) References Cited

U.S. PATENT DOCUMENTS 10,496,547 B1 *　12/2019　Naenko ............... G06F 12/0873
2005/0273571 A1 *　12/2005　Lyon ................... G06F 9/45537
　　　　　　　　　　　　　　　　　　　　711/203

(Continued)

OTHER PUBLICATIONS

PCT/US2022/042492, Jan. 11, 2023, International Search Report and Written Opinion.

(Continued)

*Primary Examiner* — Khoa D Doan
(74) *Attorney, Agent, or Firm* — Wolf, Greenfield & Sacks, P.C.

(57) ABSTRACT

Systems and methods for on-demand loading of metadata. In some embodiments, in response to receiving a page fault service request from an operating system kernel, at least one first physical page may be allocated in an application memory for a virtual address indicated in the page fault service request. Metadata may be loaded into at least one second physical page in a metadata memory, wherein: the at least one second physical page in the metadata memory corresponds to the at least one first physical page in the application memory; and the metadata loaded into the at least one second physical page corresponds to application data loaded into the at least one first physical page.

19 Claims, 6 Drawing Sheets

(58) Field of Classification Search
CPC ... G06F 12/0615; G06F 12/0046–0692; G06F 12/10–109
See application file for complete search history.

(56) References Cited

U.S. PATENT DOCUMENTS

| | | | |
|---|---|---|---|
| 2009/0113110 A1 | 4/2009 | Chen et al. | |
| 2011/0161619 A1* | 6/2011 | Kaminski | G06F 12/1027 |
| | | | 711/E12.016 |
| 2011/0167422 A1* | 7/2011 | Eom | G06F 9/45558 |
| | | | 718/1 |
| 2015/0331812 A1* | 11/2015 | Horman | G06F 11/073 |
| | | | 711/163 |
| 2020/0125502 A1 | 4/2020 | Durham et al. | |
| 2021/0133159 A1* | 5/2021 | Bono | G06F 16/1744 |
| 2021/0255890 A1 | 8/2021 | Milburn et al. | |

OTHER PUBLICATIONS

PCT/US2022/042492, Mar. 14, 2024, International Preliminary Report on Patentability.

International Search Report and Written Opinion mailed Jan. 11, 2023 in connection with International Application No. PCT/US2022/042492.

International Preliminary Report on Patentability mailed Mar. 14, 2024 in connection with International Application No. PCT/US2022/042492.

* cited by examiner

Identify Virtual Memory Area Data Structure — 505

Identify First Virtual Memory Operation(s) — 510

Replace with Second Virtual Memory Operation(s) — 515

500

Obtain Handle to Metadata Driver — 405

Obtain Metadata Location for Memory-Mapped Segment — 410

Call Metadata Driver with Metadata Location — 415

400

700

705 Read Metadata From ELF Image

710 Provide Metadata to Policy Enforcement Hardware

715 Delegate Fault Call to Device Driver

600

605 Delegate Fault Call to Device Driver

610 Determine Physical Location in Metadata Memory Corresponding to Physical Location Returned by Device Driver 615 Load Metadata into Metadata Memory

SYSTEMS AND METHODS FOR ON-DEMAND LOADING OF METADATA

RELATED APPLICATION

This application is a national stage filing under 35 U.S.C. § 371 of International Patent Application Serial No. PCT/US2022/042492, filed Sep. 2, 2022, entitled "SYSTEMS AND METHODS FOR ON-DEMAND LOADING OF METADATA", which claims the benefit under 35 U.S.C. § 119(e) of U.S. Provisional Patent Application Ser. No. 63/240,808, filed on Sep. 3, 2021, titled "SYSTEMS AND METHODS FOR ON-DEMAND LOADING OF METADATA.". The entire contents of these applications are incorporated herein by reference in their entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a computer-implemented method for on-demand loading of metadata, the method comprising acts of: receiving a page fault service request from an operating system kernel; causing at least one first physical page to be allocated in an application memory for a virtual address indicated in the page fault service request; and causing metadata to be loaded into at least one second physical page in a metadata memory, wherein: the at least one second physical page in the metadata memory corresponds to the at least one first physical page in the application memory; and the metadata loaded into the at least one second physical page corresponds to application data loaded into the at least one first physical page.

In accordance with some embodiments, a system is provided, comprising one or more circuitries and/or processors programmed by executable instructions, wherein the one or more circuitries and/or programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

It should be appreciated that security policies are described herein solely for purposes of illustration, as aspects of the present disclosure are not limited to enforcing any particular type of policy, or any policy at all. In some embodiments, one or more of the techniques described herein may be used to enforce one or more other types of policies (e.g., safety policies, privacy policies, etc.), in addition to, or instead of, security policies.

Figure 1:
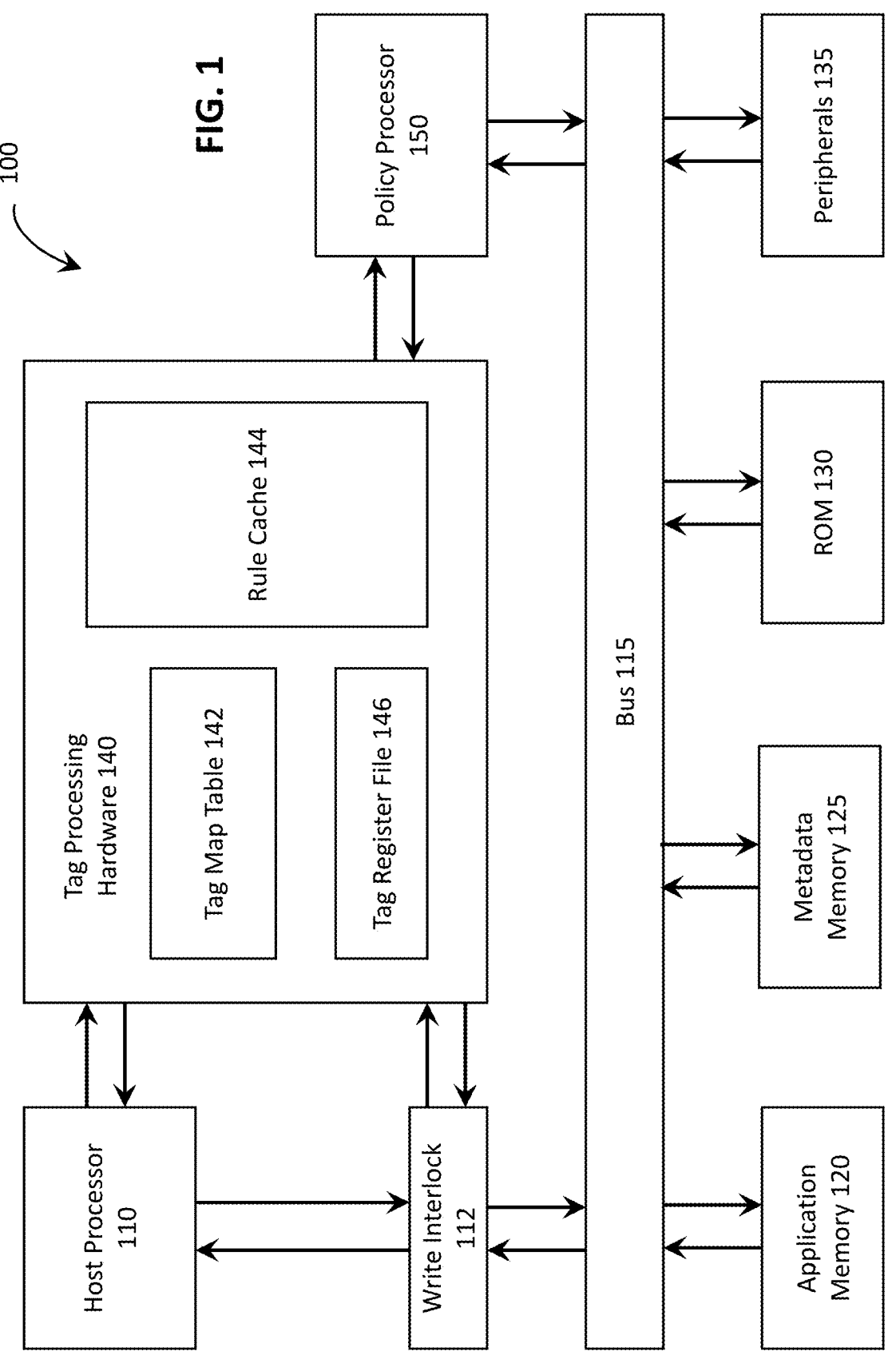
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data may be referred to herein as "application data." as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y may be referred to herein as a "metadata tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label RED may be stored at the metadata memory address Z. By storing the metadata memory address Z in the metadata memory address Y, the application data stored at the application memory address X may be tagged RED.

In this manner, the binary representation of the metadata label RED may be stored only once in the metadata memory 125. For instance, if application data stored at another application memory address X' is also to be tagged RED, the tag map table 142 may map the application memory address X' to a metadata memory address Y' where the metadata memory address Z is also stored.

Moreover, in this manner, tag update may be simplified. For instance, if the application data stored at the application memory address X is to be tagged BLUE at a subsequent time, a metadata memory address Z' may be written at the metadata memory address Y, to replace the metadata memory address Z, and a binary representation of the metadata label BLUE may be stored at the metadata memory address Z'.

Thus, the inventors have recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single metadata tag, so that all words in that region are associated with the same metadata. This may advantageously reduce a size of the tag map table 142 and/or the metadata memory 125. For example, a single metadata tag may be maintained for an entire address range, as opposed to maintaining multiple metadata tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction (e.g., a store instruction), and may queue a result of executing the instruction (e.g., a value to be stored) into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive load instructions may be queued in addition to, or instead of, store instructions. For instance, subsequent instructions attempting to access a target address of a destructive load instruction may be queued in a memory region that is not cached. If and when it is determined that the destructive load instruction should be allowed, the queued instructions may be loaded for execution.

In some embodiments, a destructive load instruction may be allowed to proceed, and data read from a target address may be captured in a buffer. If and when it is determined that the destructive load instruction should be allowed, the data captured in the buffer may be discarded. If and when it is determined that the destructive load instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding metadata tag. Additionally, or alternatively, for a register identifier received from the host processor 110, the tag processing hardware 140 may access a metadata tag from a tag register file 146 within the tag processing hardware 140.

In some embodiments, if an application memory address does not have a corresponding entry in the tag map table 142, the tag processing hardware 140 may send a query to a policy processor 150. The query may include the application memory address, and the policy processor 150 may return a metadata tag for that application memory address. Additionally, or alternatively, the policy processor 150 may create a new tag map entry for an address range including the application memory address. In this manner, the appropriate metadata tag may be made available, for future reference, in the tag map table 142 in association with the application memory address.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction. In one example, the instruction may be a load instruction, and an operand of the instruction may be an application memory address from which application data is to be loaded. The query may include, among other things, a metadata tag for a register in which the application memory address is stored, as well as a metadata tag for the application memory address itself. In another example, the instruction may be an arithmetic instruction, and there may be two operands. The query may include, among other things, a first metadata tag for a first register in which a first operand is stored, and a second metadata tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction should be allowed. For instance, the tag processing hardware 140 may send an interrupt signal to the policy processor 150, along with one or more inputs relating to the instruction (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input metadata tags) to determine if an instruction should be allowed. If the instruction is not to be allowed, the policy processor 150 may so notify the tag processing hardware 140. If the instruction is to be allowed, the policy processor 150 may compute one or more outputs (e.g., one or more output metadata tags) to be returned to the tag processing hardware 140. As one example, the instruction may be a store instruction, and the policy processor 150 may compute an output metadata tag for an application memory address to which application data is to be stored. As another example, the instruction may be an arithmetic instruction, and the policy processor 150 may compute an output metadata tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule table 144 for mapping one or more inputs to a decision and/or one or more outputs. For instance, a query into the rule table 144 may be similarly constructed as a query to the policy processor 150 to check if an instruction executed by the host processor 110 should be allowed. If there is a match, the rule table 144 may output a decision as to whether to the instruction should be allowed, and/or one or more output metadata tags (e.g., as described above in connection with the policy processor 150). Such a mapping in the rule table 144 may be created using a query response from the policy processor 150. However, that is not required, as in some embodiments, one or more mappings may be installed into the rule table 144 ahead of time.

In some embodiments, the rule table 144 may be used to provide a performance enhancement. For instance, before querying the policy processor 150 with one or more input metadata tags, the tag processing hardware 140 may first query the rule table 144 with the one or more input metadata tags. In case of a match, the tag processing hardware 140 may proceed with a decision and/or one or more output metadata tags from the rule table 144, without querying the policy processor 150. This may provide a significant speedup.

If, on the other hand, there is no match, the tag processing hardware 140 may query the policy processor 150, and may install a response from the policy processor 150 into the rule table 144 for potential future use. Thus, the rule table 144 may function as a cache. However, it should be appreciated that aspects of the present disclosure are not limited to implementing the rule table 144 as a cache.

In some embodiments, the tag processing hardware 140 may form a hash key based on one or more input metadata tags, and may present the hash key to the rule table 144. If there is no match, the tag processing hardware 140 may send an interrupt signal to the policy processor 150. In response to the interrupt signal, the policy processor 150 may fetch metadata from one or more input registers (e.g., where the one or more input metadata tags are stored), process the fetched metadata, and write one or more results to one or more output registers. The policy processor 150 may then signal to the tag processing hardware 140 that the one or more results are available.

In some embodiments, if the tag processing hardware 140 determines that an instruction (e.g., a store instruction) should be allowed (e.g., based on a hit in the rule table 144, or a miss in the rule table 144, followed by a response from the policy processor 150 indicating no policy violation has been found), the tag processing hardware 140 may indicate to the write interlock 112 that a result of executing the instruction (e.g., a value to be stored) may be written back to memory. Additionally, or alternatively, the tag processing hardware 140 may update the metadata memory 125, the tag map table 142, and/or the tag register file 146 with one or more output metadata tags (e.g., as received from the rule table 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule table 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate metadata tag.

In some embodiments, if the tag processing hardware 140 determines that the instruction represents a policy violation (e.g., based on a miss in the rule table 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule table 144 may be implemented with a hash function and a designated portion of a memory (e.g., the metadata memory 125). For instance, a hash function may be applied to one or more inputs to the rule table 144 to generate an address in the metadata memory 125. A rule table entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and described above, it should be appreciated that aspects of the present disclosure are not limited to using any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
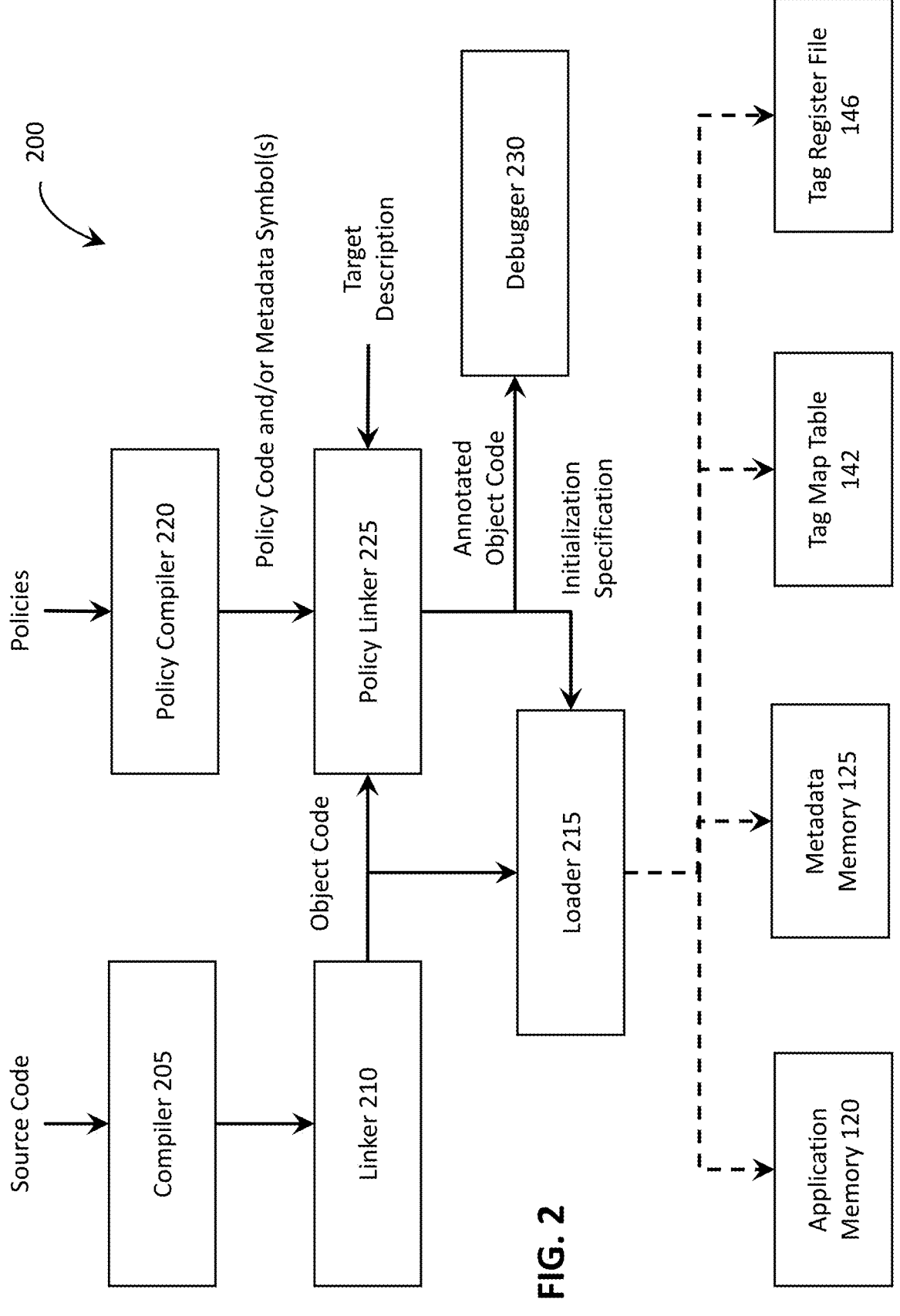
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 in the example of FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as FRAME locations, and as function epilogue instructions execute, the FRAME metadata tags may be removed. The stack policy may indicate that instructions implementing a body of the function (as opposed to function prologue and function epilogue) only have read access to FRAME locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language.

Additionally, or alternatively, the policy compiler 220 may output one or more metadata labels referenced by the one or more policies. At initialization, such a metadata label may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, may be referred to herein as a "metadata tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically-determined binary representation. Additionally, or alternatively, the policy linker 225 may resolve one or more metadata labels into a statically-determined binary representation, or a pointer to a data structure storing a statically-determined binary representation. The inventors have recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 in the example of FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata labels, and the policy linker 225 may search the target description to identify entities having those entity names. The policy linker 225 may identify descriptions of those entities from the target description, and use the descriptions to annotate, with appropriate metadata labels, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120.

The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata symbols associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which may be referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as described above, the illustrative rule table 144 in the example of FIG. 1 may map input metadata tags to output metadata tags, and, in some embodiments, the input metadata tags may be metadata memory addresses where binary representations of metadata are stored, as opposed to the binary representations themselves. The inventors have recognized and appreciated that if a same binary representation of metadata is stored at two different metadata memory addresses X and Y, the rule table 144 may not recognize an input pattern having the metadata memory address Y as matching a stored mapping having the metadata memory address X. This may result in a large number of unnecessary rule table misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the illustrative metadata memory 125 in the example of FIG.

1), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150 in the example of FIG. 1). If the binary representation of metadata has already been stored, a reference to the existing storage location may be used (e.g., installed in the illustrative rule table 144 in the example of FIG. 1).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to using a hash table to keep track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and/or described in greater detail below may be implemented in any of numerous ways, as these techniques are not limited to any particular manner of implementation. Examples of implementation details are provided herein solely for purposes of illustration. Furthermore, the techniques described herein may be used individually or in any suitable combination, as aspects of the present disclosure are not limited to any particular technique or combination of techniques.

For instance, while examples are described herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default labels (e.g., DEFAULT, PLACEHOLDER, etc.) may be used for tagging at startup, and a policy processor (e.g., the illustrative policy processor 150 in the example of FIG. 1) may evaluate one or more policies and resolve the one or more default labels in a just-in-time manner.

Further examples of techniques for initializing metadata are described in of International Application No. PCT/

US2019/016272, filed on Feb. 1, 2019, entitled "SYSTEMS AND METHODS FOR POLICY LINKING AND/OR LOADING FOR SECURE INITIALIZATION,", which is hereby incorporated by reference in its entirety.

Figure 3:
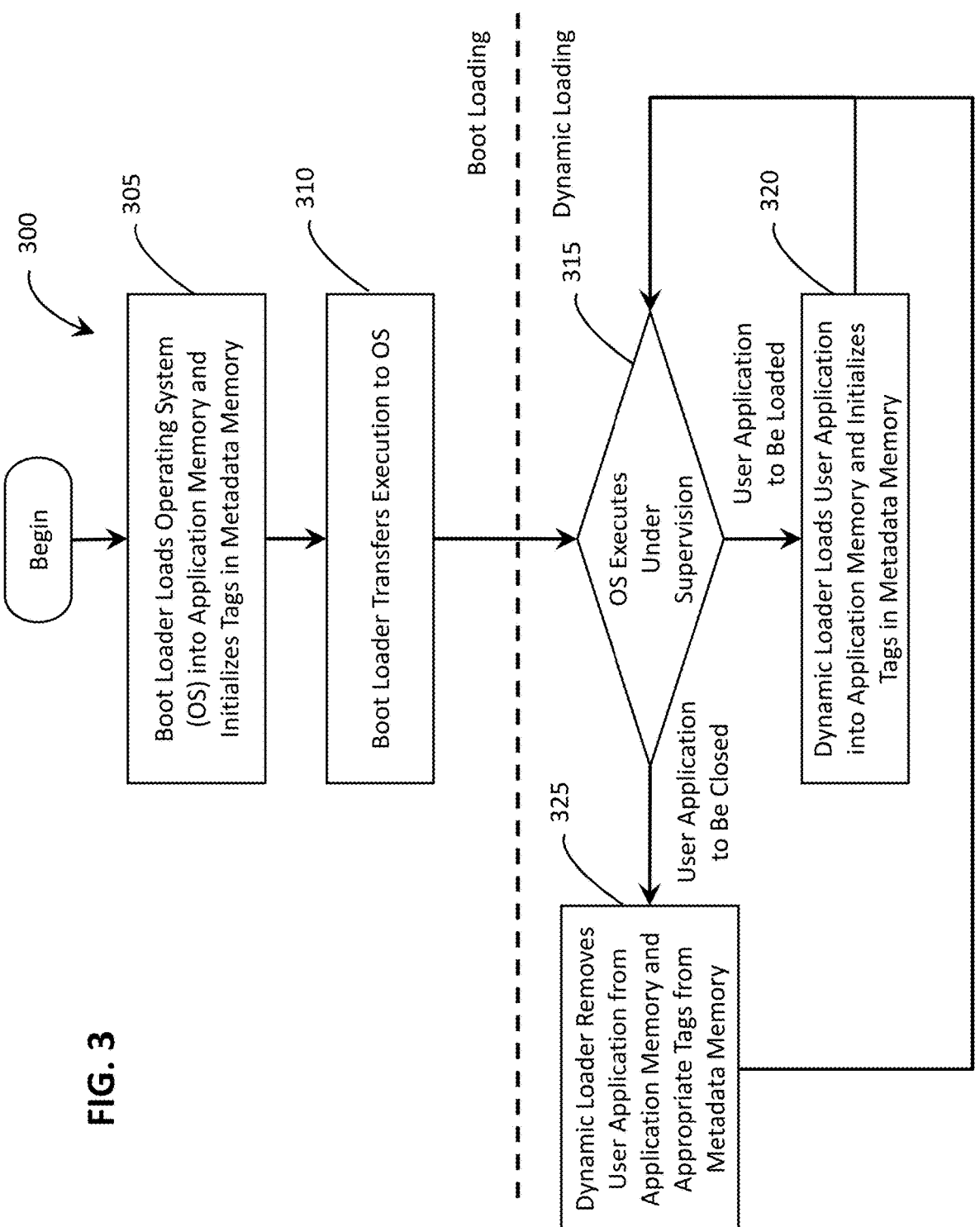
FIG. 3 shows an illustrative process 300 for loading executable code in a computer system, in accordance with some embodiments.

FIG. 3 shows an illustrative process 300 for loading executable code in a computer system, in accordance with some embodiments. For instance, with reference to the example of FIG. 2, the process 300 may be performed by the illustrative loader 215 to load data and/or instructions into the application memory 120, and/or initialize metadata tags in the illustrative metadata memory 125 for the data and/or instructions.

In the example of FIG. 3, the process 300 includes two stages, boot loading and dynamic loading. One or both of these stages may be performed by the loader 215. For instance, the loader 215 may include a boot loader and a dynamic loader. In some embodiments, the dynamic loader may be part of an operating system, which may instruct a driver associated with a storage device to load data and/or instructions from the storage device. However, it should be appreciated that aspects of the present disclosure are not limited to having a dynamic loader that is part of an operating system.

In some embodiments, the boot loader and the dynamic loader may be executed by physically separate processors. For instance, the boot loader may be executed by the illustrative policy processor 150 in the example of FIG. 1, while the dynamic loader may be executed by the illustrative host processor 110. However, it should be appreciated that aspects of the present disclosure are not limited to executing the boot loader and the dynamic loader in any particular manner. In some embodiments, both the boot loader and the dynamic loader may execute on a same processor (e.g., the policy processor 150 or the host processor 110).

The inventors have recognized an appreciated that having separate machine state for loader code (e.g., by loading the loader code into a memory separate from an application memory and/or using a separate set of registers for executing the loader code) may make it more difficult for an attacker to gain access to, or modify, metadata. For instance, having separate machine state may make it more difficult for an attacker to take control over the loader code. However, it should be appreciated that aspects of the present disclosure are not limited to executing loader code on the policy processor 150 as opposed to the host process 110. In some embodiments, the boot loader and/or the dynamic loader may execute on the host processor 110, and may be secured by a loader policy.

In some embodiments, a loader policy may restrict a privilege of modifying metadata to loader code executing in a correct context. As one example, the loader policy may include one or more rules indicating that only legitimate binary images may be loaded, such as binary data associated with a metadata symbol proving the binary data is from a valid source. This metadata symbol may have been attached to the binary data by another process that has verified the binary data's integrity and/or authenticity (e.g., based on a cryptographic digital signature).

As another example, the loader policy may include one or more rules that enforce control flow integrity, such that program execution may only transfer from a selected point in OS code to loader code. In this manner, the loader policy may prevent malicious attacker code from loading an illegitimate binary image.

Additionally, or alternatively, a loader policy may include one or more rules indicating that loader code may not be modified or copied, loader instructions may execute only in a selected sequence, etc.

Returning to FIG. 3, the boot loader may, at act 305, load a binary image of an operating system into the application memory 120. Additionally, or alternatively, the boot loader may initialize metadata tags in the metadata memory 125 according to an initialization specification for the OS. The OS binary image and/or the OS initialization specification may be retrieved from persistent storage (e.g., flash memory, hard disk, ROM, etc.). As described above, the OS initialization specification may be produced by a policy linker (e.g., the illustrative policy linker 225 in the example of FIG. 2) based on the OS binary image, compiled code for one or more policies applicable to the OS (e.g., a dynamic loader policy), and/or a target description.

In some embodiments, the OS binary image and/or the OS initialization specification may be electronically signed. A public key corresponding to a private key used for signing may be distributed in a suitable manner (e.g., using a public key infrastructure). The private key itself may not be distributed. The boot loader may use the public key to verify that the OS binary image and/or the OS initialization specification have not been modified.

At act 310, the boot loader may transfer execution to the OS, which may complete the boot loading stage and commence the dynamic loading stage. At act 315, the OS may execute under supervision of policy enforcement hardware, such as the illustrative write interlock 112, the illustrative tag processing hardware 140, the illustrative policy processor 150, and/or the illustrative metadata memory 125 in the example of FIG. 1.

In the example shown in FIG. 3, the OS includes the dynamic loader. At act 320, the dynamic loader may load a binary image of a user application into the application memory 120, for example, in response to a user launching the user application. Additionally, or alternatively, the dynamic loader may initialize metadata tags in the metadata memory 125 according to an initialization specification for the user application. The user application binary image and/or the user application initialization specification may be retrieved from persistent storage (e.g., flash memory, hard disk, ROM, etc.). As described above, the user application initialization specification may be produced by a policy linker (e.g., the illustrative policy linker 225 in the example of FIG. 2) based on the user application binary image, compiled code for one or more policies applicable to the user application, and/or the target description.

In some embodiments, the dynamic loader may initialize metadata tags in the metadata memory 125 by triggering one or more rules of a loader policy. For instance, the dynamic loader may perform certain operations on a designated region in the application memory 120, which may trigger evaluation of one or more rules of the loader policy by the tag processing hardware 140 and/or the policy processor 150, thereby creating and applying metadata tags. Such metadata tags may include composite metadata tags, where each composite metadata tag may be constructed using one or more primitive metadata tags. Each primitive metadata tag may correspond to a metadata symbol referenced by a policy.

In some embodiments, the user application binary image and/or the user application initialization specification may be electronically signed. A public key corresponding to a private key used for signing may be distributed in a suitable manner (e.g., using a public key infrastructure). The private key itself may not be distributed. The dynamic loader may use the public key to verify that the user application binary image and/or the user application initialization specification have not been modified.

Additionally, or alternatively, loading the user application binary image using the user application initialization specification may trigger one or more loader policy rules. For instance, the one or more rules, when evaluated, may look for one or more metadata symbols proving the user application binary image and/or the user application initialization specification are from a valid source. The one or more metadata symbols may have been attached to the user application binary image and/or the user application initialization specification by another process that has performed a verification using the public key.

Since the OS and the user application may be distributed by different vendors, the public-private key pairs used to sign and verify the OS and the user application may be different.

In some embodiments, once loaded and tagged, the user application may execute under supervision of policy enforcement hardware (e.g., the illustrative write interlock 112, the illustrative tag processing hardware 140, the illustrative policy processor 150, and/or the illustrative metadata memory 125 in the example of FIG. 1).

In some embodiments, the dynamic loader may also handle teardown and cleanup of terminated applications. For instance, at act 325, the dynamic loader may remove the binary image of the user application from the application memory 120 in response to a user closing the user application or shutting down the computer system. In some embodiments, removing the binary image of the user application may trigger evaluation of one or more loader policy rules by the tag processing hardware 140 and/or the policy processor 150, which may cause removal of all entries in the tag map table 142 that are related to the user application, and/or corresponding metadata from the metadata memory 125 and/or the tag register file 146. In some embodiments, where a same metadata tag may be associated with different user applications, metadata that is no longer referenced anywhere in the tag map table 142 may be removed, or marked as ready to be overwritten.

The inventors have recognized and appreciated that security may be improved by removing corresponding metadata when an application is terminated. For instance, if the corresponding metadata is removed, a subsequent attempt to execute the application's instructions or access the application's data may trigger a policy violation. This may prevent code reuse attacks, replay attacks, etc. However, it should be appreciated that aspects of the present disclosure are not limited to removing metadata in any particular manner, or at all.

In some OSes, loading may be performed in an on-demand manner. For instance, data and/or instructions for an OS kernel may be loaded incrementally as needed, as opposed to all at once when the OS is launched. For instance, a Linux kernel may include a preliminary ELF loader, which may not perform full dynamic linking of shared objects. Once the kernel has started, loading of a complete environment may be bootstrapped.

Likewise, data and/or instructions for a user application may be loaded incrementally as needed, as opposed to all at once when the user application is launched. In some embodiments, application binaries may include ELF images with a .interp section, which may identify an on-demand linker. As an example, an on-demand linker may be/lib64/ld-linux-x86-64.so.2, which may be separate from a Linux kernel.

While this on-demand linker may be named as a shared object, there may be no dependency on any other shared object, and no symbol may be exported. Therefore, a kernel loader may load this on-demand linker as a stand-alone executable.

In some embodiments, when an application is started by a system call to an OS kernel, the kernel may validate the application's ELF image, create a process, load an on-demand linker specified in a .interp section of the ELF image, and transfer control to the on-demand linker in user mode with access to the ELF image to be loaded. From that point on, the on-demand linker may take over loading of the application.

In some embodiments, the on-demand linker may obtain, from the kernel via a system call, a file handle for the ELF image to be loaded. The on-demand linker may read and validate the ELF image, and may process one or more segments to be loaded.

In some embodiments, the on-demand linker may not perform file read operations to load instructions and/or data of the image. Rather, the on-demand linker may use system calls (e.g., mmap) to memory map the file. Additionally, or alternatively, the on-demand linker may use system calls to set page protections for read/write/execute attributes.

In some embodiments, the memory mapping may produce virtual addresses that may be used as runtime addresses for the instructions and/or data of the image. However, some areas of the image (e.g., a .bss section) may be uninitialized. For instance, the application may include a static variable that is declared but not initialized with any value. Accordingly, uninitialized areas may not be mapped from the image, but may still be allocated by the memory mapping system calls.

In some embodiments, once the on-demand linker has allocated one or more segments of the image via memory mapping system calls, the on-demand linker may transfer control over to an entry point of the application. This entry point may have a virtual address that is in one of the mapped memory blocks.

In some embodiments, when control is transferred to the application entry point, the instructions and/or data of the application may not have been loaded into physical memory (e.g., the illustrative application memory 120 in the example of FIG. 1). Indeed, physical memory may not have been allocated. Only a virtual address space, including one or more virtual memory pages, may have been allocated.

In some embodiments, once control is transferred to the application entry point, a processor (e.g., the illustrative host processor 110 in the example of FIG. 1) may attempt to load instructions and/or data from a virtual memory page where the entry point is located. Because such a page has not been loaded into the physical memory, a page fault may be issued, which may transfer control back to the kernel.

In some embodiments, the kernel may include a page fault handler, which may allocate a page table entry for the requested page, and may cause instructions and/or data of the requested page to be loaded from the ELF image, before returning control to the application in user mode. Thus, during execution of the page fault handler, a portion of physical memory may be allocated for the requested page, and may be populated with instructions and/or data from the ELF image.

The inventors have recognized and appreciated that on-demand loading may result in pages of different applications being interspersed in physical memory. Additionally, or alternatively, instructions of an application may be interspersed in physical memory with data of the same application. Therefore, it may be challenging to establish correct association between application data and metadata.

In some embodiments, when a page of application data is loaded into an application memory, corresponding metadata may be identified and loaded into a metadata memory. The inventors have recognized and appreciated that, until the corresponding metadata is loaded, policy enforcement hardware (e.g., the illustrative write interlock 112, the illustrative tag processing hardware 140, the illustrative policy processor 150, and/or the illustrative metadata memory 125 in the example of FIG. 1) may be unable to enforce one or more policies. Therefore, it may be desirable to identify and load the corresponding metadata before, at the same time as, or shortly after, the application data is loaded. For instance, it may be desirable to identify and load the corresponding metadata before any instruction in the application data is executed.

In some embodiments, metadata for instructions and/or data in an ELF image may be stored in the ELF image itself. This may allow efficient identification and loading of the metadata when the instructions and/or data are loaded.

In some embodiments, an OS kernel may maintain one or more data structures. For instance, when an OS kernel starts a new process, the kernel may allocate a data structure (e.g., an mm_struct) to hold information about virtual memory allocated for the process. Additionally, or alternatively, for each virtual memory area allocated by memory mapping (e.g., via an mmap system call), a data structure (e.g., a vm_area_struct) may be allocated to hold information relevant to the virtual memory area, such as file mapping information. The inventors have recognized and appreciated that one or more of these data structures may be used to support on-demand loading of metadata.

In some embodiments, for a memory-mapped virtual memory region (e.g., a region to which a segment of an ELF image is mapped), a vm_area_struct may have one or more fields that may be used to support on-demand loading of metadata. As an example, the vm_area_struct may have a vm_file field, which may store a pointer to a kernel file structure for the image. The kernel file structure may be created by the kernel when the image is opened, and may store information regarding the image, such as a location of the image in a file system, a current reading or writing position, one or more access permissions (e.g., read and/or write access), etc.

As another example, the vm_area_struct may have a vm_ops field, which may store a pointer to a vm_operations_struct, which may store one or more functions provided by a device driver for the file system from which the image is being loaded. Examples of such functions include, but are not limited to, I/O functions and/or a fault handler function for handling page faults.

As described above, when a page fault occurs, control may be transferred back to an OS kernel. The kernel may look up a virtual address of the fault in an mm_struct for a process causing the page fault. This may lead to a vm_area_struct corresponding to the virtual address, and the vm_area_struct may in turn include a vm_file pointer and/or a vm_ops pointer.

Additionally, or alternatively, the kernel may allocate a page table entry, and may populate a vm_fault structure with information about the fault, such as the page table entry and the vm_area_struct. The kernel may then call a fault handler in a vm_operations_struct referenced by the vm_ops pointer in the vm_area_struct.

In some embodiments, the fault handler in the vm_operations_struct may be implemented by a device driver for an underlying file system serving the (memory-mapped) ELF image. The fault handler may allocate a physical page for a virtual memory page of the fault, and may populate the physical page from the ELF image. The information in the vm_fault structure and/or the vm_area_struct may allow the device driver to locate the instructions and/or data to be loaded from the ELF image. Once the device driver is finished, control may be returned to the kernel's fault handler, and the kernel may restart the faulting process in user mode.

Thus, the above-described memory mapping techniques may allow on-demand loading to be performed in a manner that does not depend on how an underlying storage device works. For example, by intentionally allowing the page fault to occur, the kernel effectively delegates the actual loading to the fault handler provided by the device driver, as opposed to the kernel itself.

The inventors have recognized and appreciated that the above-described memory mapping techniques may allow on-demand loading to be performed via different device drivers. Accordingly, in some embodiments, a device driver may be provided for on-demand loading of metadata. To disambiguate, a device driver for on-demand loading of metadata (as opposed to application data) may be referred to herein as a "metadata driver."

In some embodiments, metadata for instructions and/or data in an ELF image may be stored in the ELF image itself. However, loading of the instructions and/or data may be performed by a device driver, while loading of the metadata may be performed by a metadata driver. The metadata driver may operate in kernel mode. The inventors have recognized and appreciated that such an arrangement may allow efficient identification and loading of the metadata when the instructions and/or data are loaded on demand.

Figure 4:
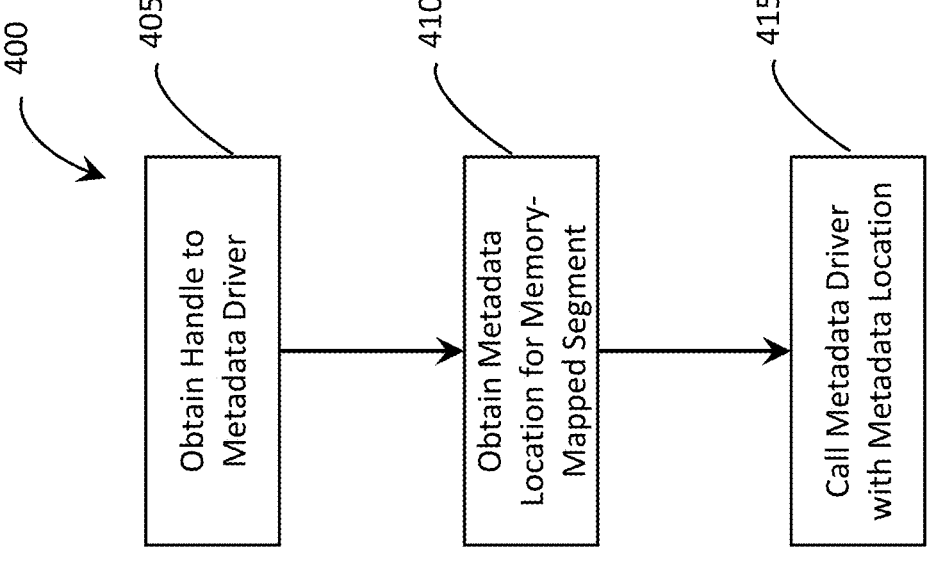
FIG. 4 shows an illustrative process 400 for processing an ELF image, in accordance with some embodiments.

FIG. 4 shows an illustrative process 400 for processing an ELF image, in accordance with some embodiments. For instance, the process 400 may be performed by an on-demand linker to allocate virtual memory areas for various segments of the image. As described above, the on-demand linker may be identified in the ELF image (e.g., in a .interp section), and may operate in user mode.

In some embodiments, the on-demand linker may determine whether the ELF image includes metadata for policy enforcement. For instance, the on-demand linker may obtain (e.g., from a suitable registry) one or more identifiers for sections including metadata, and may check a header of the ELF image to determine if one or more such sections are present.

In response to determining that the ELF image includes metadata for policy enforcement, the on-demand linker may, at act 405, obtain a handle to a metadata driver. For instance, the on-demand linker may identify a pointer associated with the metadata driver, and may use the pointer to access a data structure maintained by an OS kernel for the metadata driver.

As described above, one or more segments in the ELF image may be memory mapped (e.g., via one or more mmap system calls). Given such a segment, the on-demand linker may, at act 410, obtain information about one or more locations in the ELF image where metadata for that segment is stored. For instance, the on-demand linker may use a suitable naming convention to convert an identifier of a given section to an identifier for another section where corresponding metadata is stored.

It should be appreciated that aspects of the present disclosure are not limited to storing corresponding metadata in the ELF image itself. In some embodiments, corresponding metadata may be stored in a separate file. A suitable naming convention may be used to identify such a file. For example, if the ELF image is named calc.bin, the file storing the corresponding metadata may be named calc.meta.

At act 415, the on-demand linker may use the handle obtained at act 405 to issue a system call to the metadata driver, and may pass to the metadata driver a virtual address to which the segment is mapped, and the information about the location(s) of the metadata in the ELF image.

In some embodiments, the metadata driver may redirect page fault service requests by modifying one or more data structures maintained by an OS kernel.

Figure 5:
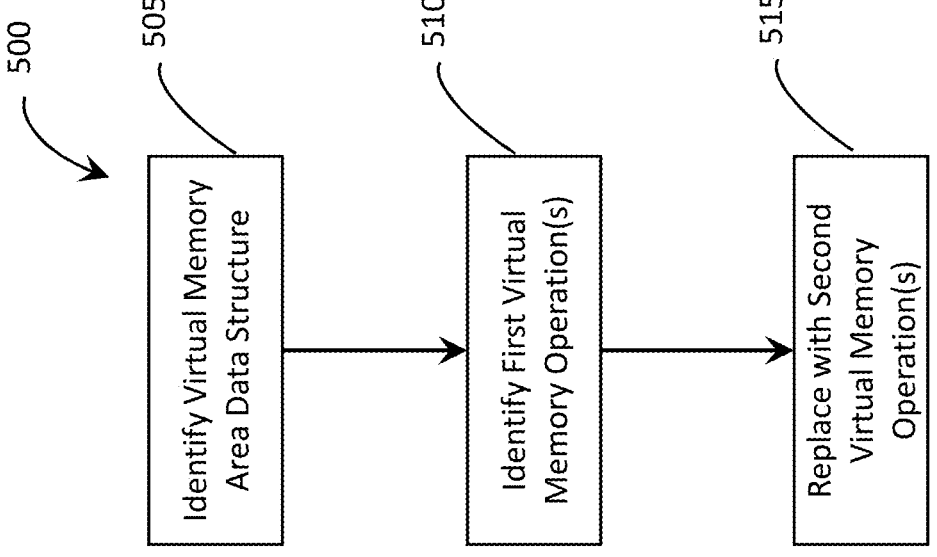
FIG. 5 shows an illustrative process 500 for redirecting page fault service requests, in accordance with some embodiments.

FIG. 5 shows an illustrative process 500 for redirecting page fault service requests, in accordance with some embodiments. For instance, the process 500 may be performed by a metadata driver upon being invoked by the illustrative on-demand linker in the example of FIG. 4.

At act 505, the metadata driver may identify a virtual memory area data structure. For instance, the metadata driver may first identify a memory mapping data structure (e.g., an mm_struct) for a process that invoked the metadata driver (e.g., a process in which the on-demand linker is executing). The mm_struct may in turn be used to identify a virtual memory area data structure.

As an example, the on-demand linker may have called the metadata driver with a virtual address, and the metadata driver may use the mm_struct to identify a virtual memory area data structure (e.g., a vm_area_struct) corresponding to that virtual address.

At act 510, the metadata driver may use the vm_area_struct identified at act 505 to identify one or more first virtual memory operations. For instance, the vm_area_struct may include a field (e.g., a vm_ops field) storing information regarding one or more first virtual memory operations. As described above, the vm_ops field may store a pointer to a virtual memory operations data structure (e.g., a vm_operations_struct), which may store a fault handler function for handling page faults. The fault handler function may be provided by a device driver for a file system from which an ELF image is loaded.

In some embodiments, the metadata driver may save current content of the vm_ops field, for example, into a metadata_info field. For instance, the metadata driver may add a metadata_info field to the vm_operations_struct or some other suitable data structure.

Additionally, or alternatively, the on-demand linker may have called the metadata driver with information indicating one or more locations in the ELE image where metadata corresponding to the virtual address is stored. The metadata driver may store that metadata location information in the metadata_info field.

At act 515, the metadata driver may replace the one or more first virtual memory operations with one or more second virtual memory operations. For instance, the metadata driver may update the vm_ops field of the vm_area_struct to replace the current pointer with a different pointer, which may point to a different virtual memory operations data structure storing one or more functions implemented by the metadata driver.

In this manner, the metadata driver may be able to intercept a page fault service request from the kernel. For instance, when a page fault occurs, the kernel may proceed as described above to handle the fault. However, because a vm_ops field of a relevant vm_area_struct has been modified, a fault handler of the metadata driver may be called, instead of a fault handler of a device driver.

Figure 6:
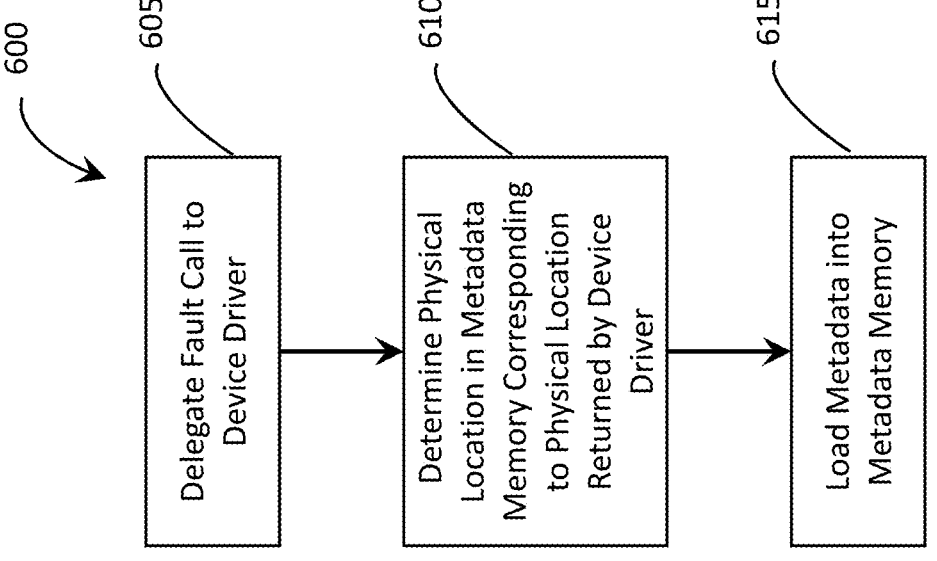
FIG. 6 shows an illustrative process 600 for servicing a page fault, in accordance with some embodiments.

FIG. 6 shows an illustrative process 600 for servicing a page fault, in accordance with some embodiments. For instance, the process 600 may be performed by a metadata driver in response to an OS kernel calling a fault handler of the metadata driver.

At act 605, the metadata driver may delegate the fault call to a device driver. For instance, the kernel may have called the fault handler of the metadata driver with an identifier of a process causing the page fault, and the metadata driver may identify a memory mapping data structure (e.g., an mm_struct) for that process.

Additionally, or alternatively, the kernel may have called the fault handler of the metadata driver with a virtual address associated with the page fault, and the metadata driver may use the mm_struct to identify a virtual memory area data structure (e.g., a vm_area_struct) corresponding to that virtual address. The metadata driver may then identify a metadata_info field in the vm_area_struct (or some other suitable data structure).

As described above in connection with the example of FIG. 5, the metadata_info field may store a pointer copied from a vm_ops field of the vm_area_struct. The pointer may point to a virtual memory operations data structure (e.g., a vm_operations_struct), which may store a fault handler of a device driver.

Accordingly, the metadata driver may delegate the fault call to the device driver by calling the fault handler of the device driver. For instance, the metadata driver may pass along, to the device driver, information received from the kernel, such as the identifier of the process causing the page fault, and/or the virtual address associated with the page fault.

In some embodiments, when the fault handler of the device driver returns, a physical page may have been allocated in an application memory (e.g., the illustrative application memory 120 in the example of FIG. 1), and may have been populated by the device driver with appropriate instructions and/or data from an ELF image. Thus, a physical location of the instructions and/or data in the application memory 120 may now be known.

At act 610, the metadata driver may determine a physical location in a metadata memory (e.g., the illustrative metadata memory 125 in the example of FIG. 1) for storing metadata corresponding to the instructions and/or data loaded into the application memory 120. For instance, in some embodiments, the application memory 120 and the metadata memory 125 may be implemented in a same physical memory, and the metadata driver may apply a suitable mapping to a physical address of the instructions and/or data in the application memory 120 to obtain a corresponding physical address in the metadata memory 125 (e.g., by adding a suitable offset to the physical address of the instructions and/or data). Additionally, or alternatively, the metadata driver may query policy enforcement hardware (e.g., the illustrative tag processing hardware 140 or the illustrative policy processor 150 in the example of FIG. 1) with the physical address of the instructions and/or data, and the policy enforcement hardware may return a corresponding physical address in the metadata memory 125. This may be done in any suitable manner, for example, via a kernel request.

Illustrative techniques for mapping target addresses to metadata addresses are described in International Application No. PCT/US2019/060698, filed on Nov. 11, 2019, entitled "SYSTEMS AND METHODS FOR METADATA ENCODING,", which is hereby incorporated by reference in its entirety.

In some embodiments, the kernel and/or the policy processor 150 may maintain a tag map table, which may be implemented in software. (By contrast, the illustrative tag map table 142 in the example of FIG. 1 may be implemented in hardware.) If the physical address of the instructions and/or data does not have a matching entry in the software tag map table, such an entry may be created and added to the software tag map table.

In some embodiments, the software tag map table may be a superset of the tag map table 142. Thus, if a lookup in the tag map table 142 fails, a lookup may be performed in the software tag map table. If a matching entry is found in the software tag map table, the matching entry may be added to the tag map table 142.

Referring again to act 610 in the example of FIG. 6, the metadata driver may, in some embodiments, allocate a physical page in the metadata memory 125 at the determined location. The physical page in the metadata memory 125 may be smaller than the physical page storing the instructions and/or data in the application memory 120. For instance, each word in the application memory 120 may correspond to a halfword in the metadata memory 125. However, it should be appreciated that aspects of the present disclosure are not limited to using metadata tags of any particular size.

At act 615, the metadata driver may cause metadata to be loaded into the metadata memory 125 at the location determined at act 610. For instance, as described above in connection with the example of FIG. 5, the metadata_info field of the vm_area_struct (or some other suitable data structure) may store information indicating one or more locations in the ELF image where metadata corresponding to the virtual address is stored. The metadata driver may use a suitable file system interface (e.g., an interface indicated in a vm_file field in the vm_area_struct) to load the metadata from the ELF image into the physical page allocated at act 610 in the metadata memory 125.

In some embodiments, the call to the file system interface may be handled by the device driver. Accordingly, a policy may be provided to ensure that the device driver is permitted to write into the metadata memory 125 only when called by the metadata driver (or some other component executing in kernel mode).

Although details of implementation are shown in FIGS. 3-6 and described above, it should be appreciated that such details are provided solely for purposes of illustration. Aspects of the present disclosure are not limited to loading metadata in any particular manner, or at all.

Figure 7:
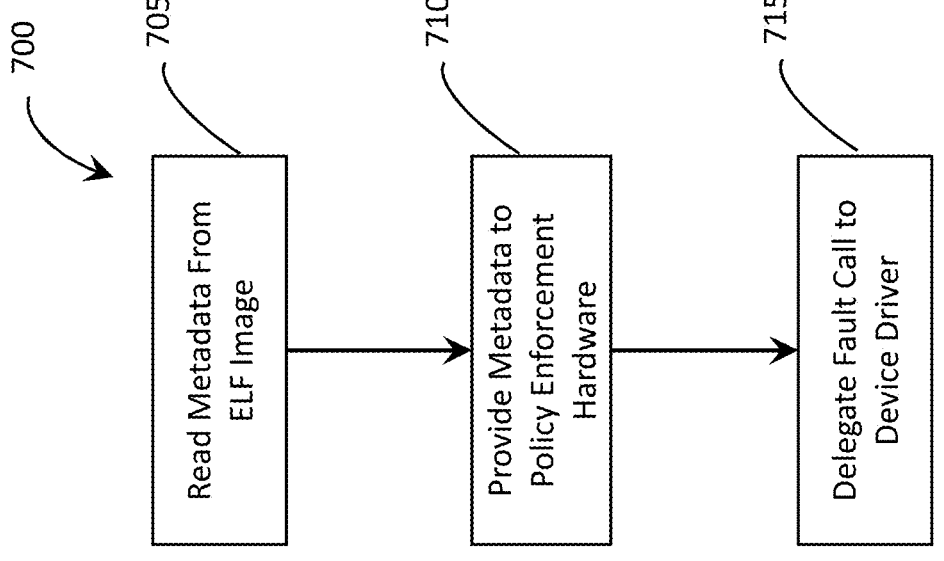
FIG. 7 shows another illustrative process 700 for servicing a page fault, in accordance with some embodiments.

FIG. 7 shows another illustrative process 700 for servicing a page fault, in accordance with some embodiments. For instance, the process 700 may be performed by a metadata driver in response to an OS kernel calling a fault handler of the metadata driver, in addition to, or instead of, the illustrative process 600 in the example of FIG. 6.

In the example of FIG. 7, the metadata driver does not explicitly determine a physical location in a metadata memory 125, as described above in connection with acts 610 and 615. Instead, at act 705, the metadata driver may use the file system interface to read the metadata from the ELF image. At act 710, the metadata driver may provide the metadata to policy enforcement hardware, such as the tag processing hardware 140. The metadata may be stored in a selected location within the tag processing hardware 140, such as a selected register in the illustrative tag register file 146 in the example of FIG. 1.

At act 715, after having provided the metadata to the tag processing hardware 140, the metadata driver may delegate the fault call to the device driver. A policy may be provided so that, as the device driver loads the instructions and/or data into the application memory 120 at act 605, each such load triggers a corresponding load of metadata from the selected register into the metadata memory 125.

For instance, the policy may associate a designated metadata value with each load instruction of the device driver (e.g., by associating the designated metadata value with an application memory address at which the load instruction is stored). Upon detecting the designated metadata value, the tag processing hardware 140 may: (i) use the tag map table 142 to map the target address of the load instruction to a metadata memory address, (ii) retrieve a metadata tag from the selected register, and (iii) store the metadata tag at the metadata memory address.

In some embodiments, the selected register may be implemented as a first-in-first-out (FIFO) queue. The metadata driver may provide the metadata to the tag processing hardware 140 in an ordering that matches an ordering in which the instructions and/or data are loaded into the application memory 120 by the device driver. In this manner, a correct correspondence may be maintained, even though the metadata driver may not have access to the address mapping stored in the tag map table 142.

Referring again to act 710 in the example of FIG. 7, the metadata driver may, in some embodiments, store the metadata temporarily in a physical page in the metadata memory 125, instead of (or in addition to) the selected register in the tag processing hardware 140. The metadata driver may then provide a pointer to this physical page in the metadata memory 125 to the policy processor 150, which may transfer the metadata to an appropriate location in the metadata memory 125 based on the address mapping stored in the tag map table 142.

Additionally, or alternatively, the transfer of the metadata may be performed by a direct memory access (DMA) engine, which may have access to the metadata memory 125 and the tag map table 142, and may be subject to a DMA policy.

As described above, uninitialized sections in an ELF image may be handled differently by an OS kernel. Accordingly, an on-demand linker (e.g., the illustrative on-demand linker in the example of FIG. 4) may allocate, but not commit, one or more virtual memory areas for such a section. The one or more allocated memory areas may be populated with zeros by a zero initialization device (e.g., a DMA engine) in an on-demand manner (e.g., in response to detecting an attempt to access an allocated but unmapped virtual memory area).

The inventors have recognized and appreciated that an allocated but unmapped virtual memory area may be larger than what a physical memory is able to hold at one time. However, such a virtual memory area may be sparsely populated at run time. For instance, only a few pages may be zero initialized in an on-demand manner. Therefore, only a small amount of physical memory may actually be used at any given moment in time.

Accordingly, in some embodiments, a default metadata tag may be provided in an ELF image for an uninitialized section. Such a default metadata tag may be provided to a metadata driver, along with an indication that a corresponding allocated but unmapped virtual memory area may be handled by a zero initialization device. For instance, at act 415 in the example of FIG. 4, the on-demand linker may pass, to the metadata driver, the default metadata tag and/or the indication of the corresponding allocated but unmapped virtual memory area.

In some embodiments, the metadata driver may, at act 605 in the example of FIG. 6, determine whether the page fault is in a virtual memory area that is allocated but unmapped. If so, the metadata driver may delegate the fault call to the underlying zero initialization device, instead of the device driver. Additionally, or alternatively, the metadata driver may, at act 615, iterate the default metadata tag in the allocated physical page in the metadata memory 125, rather than attempting to load metadata from the ELF image.

Additionally, or alternatively, in an embodiment in which the metadata driver does not have access to an address mapping between the application memory 120 and the metadata memory 125, the metadata driver may cause the policy processor 150 (or a DMA engine with access to the metadata memory 125 and the tag map table 142) to iterate the default metadata tag at an appropriate location in the metadata memory 125.

In some instances, a user application may be subject to one or more meaningful policies (e.g., integrity, safety, etc.), while another user application may not be subject to any meaningful policy. The former may be referred to herein as a "tagged application," while the latter may be referred to herein as an "untagged application." No metadata may be provided in an ELF image of an untagged application.

Accordingly, a mechanism may be provided for determining whether an instruction is from a tagged application or an untagged application. If an instruction is from an untagged application, policy enforcement hardware may be disabled for that instruction.

The inventors have recognized and appreciated that such a mechanism may lead to increased complexity (e.g., power, performance, area, etc.). Instead, it may be simpler to have the policy enforcement hardware check every instruction, where an instruction from an untagged application may be checked against a policy that allows every instruction associated with a designated metadata value (or one of several designated metadata values). Such a policy may be referred to herein as a "waiver policy."

In some embodiments, a boot process for an OS kernel (e.g., the illustrative boot loader in the example of FIG. 3) may initialize one or more metadata storage locations (e.g., a metadata memory, a metadata cache, a metadata register, and/or a metadata register file) with one or more designated metadata values for a waiver policy.

Additionally, or alternatively, tag map table entries may be provided for one or more locations in an application memory where instructions and/or data of the kernel are stored, one or more locations in the application memory that are accessible to one or more untagged applications executing in user mode, and/or one or more locations in a metadata memory. The tag map table entries may map such memory locations to the one or more metadata storage locations where the one or more designated metadata values for the waiver policy are stored. This may allow the kernel and/or one or more untagged applications to run.

Additionally, or alternatively, an instruction upon entry of a system call may be associated with a first metadata value that causes the policy enforcement hardware to enter a waiver mode, whereas an instruction that exits of the system call may be associated with a second metadata value that causes the policy enforcement hardware to return to a normal mode. Such modes may be tracked in any suitable manner, for example, by modifying a metadata tag for a program counter.

It should be appreciated that aspects of the present disclosure are not limited to always allowing an OS kernel to run. In some embodiments, an OS kernel may be subject to one or more meaningful policies, such as a stack protection policy.

In some instances, a tagged application may issue a system call to an OS kernel (e.g., to request status information about a file), and may pass to the kernel a pointer to an application data structure to be filled in by the kernel. An application memory location for that structure may have associated metadata for one or more policies (e.g., heap protection, local variable protection, etc.).

Accordingly, in some embodiments, an OS kernel may be subject to a default kernel policy, which may have one or more rules to ensure that, when the kernel is reading from or writing to an application memory location with existing metadata, such metadata is treated appropriately. For instance, the existing metadata may remain unaltered, or a selected update may be performed, as appropriate.

For example, an application memory location may be associated with both fixed metadata (e.g., a cell color for the location itself, under a heap protection policy) and flow metadata (e.g., a pointer color for a pointer stored in the location, under the heap protection policy). A rule of the default kernel policy may ensure that, when the kernel writes to the application memory location, the fixed metadata remains unaltered, while the flow metadata is updated as appropriate.

For instance, a metadata tag may have a portion that is designated as fixed metadata, and/or a portion that is designated as flow metadata. The kernel policy may ensure that the fixed metadata portion remains unaltered, while the flow metadata portion is updated as appropriate.

In some instances, the kernel may access the application memory location using a pointer that is different from what is received from the application, so that the pointer used may not be associated with a pointer color that matches the cell color for the location. Because the kernel is not subject to the heap protection policy, the kernel may be able to write to the location despite the mismatch. Nevertheless, the default kernel policy may ensure that the fixed metadata remains unaltered, while the flow metadata is updated.

Illustrative techniques for classifying metadata (e.g., fixed vs. flow) are described in International Application No. PCT/US2020/013678, filed on Jan. 15, 2020, entitled "SYSTEMS AND METHODS FOR METADATA CLASSIFICATION,", which is hereby incorporated by reference in its entirety.

In some embodiments, when a tagged application terminates, one or more designated metadata values for a waiver policy may be written into one or more metadata memory locations associated with application memory locations of the tagged application, to replace metadata previously stored at the one or more metadata memory locations. This may allow the application memory locations to be later allocated for an untagged application.

Such refreshing of metadata may be done in any suitable manner. For instance, termination of a tagged application may trigger a rule of a waiver policy, and the metadata refreshing may be performed by policy enforcement hardware as a result of checking that rule.

Additionally, or alternatively, upon termination of a tagged application, the kernel may call a metadata driver to perform metadata refreshing (e.g., using any of the illustrative techniques described above for loading metadata).

Additionally, or alternatively, metadata refreshing may be done by a metadata driver when an untagged application is loaded.

In some embodiments, a tag map table entry for an application memory location, a metadata memory location, or a peripheral device location may store a designated metadata value for a waiver policy, instead of a metadata memory address where the designated metadata value is stored. This may allow an OS kernel and/or a metadata driver in kernel mode to access the application memory location, the metadata memory location, or the peripheral device location (e.g., read and/or write access).

The inventors have recognized and appreciated that, if a metadata driver calls a device driver to load metadata, the device driver may be given access to a metadata memory. In some embodiments, to mitigate risk of the device driver being compromised, only limited access may be given to the device driver. As an example, when the metadata driver calls the device driver, the metadata driver may store a designated metadata value into a designated metadata register (e.g., an ENV register). When the device driver returns, the metadata driver may remove the designated metadata value. A kernel policy may be provided to prevent the device driver from modifying the designated metadata register. Additionally, or alternatively, a metadata memory policy may be provided to prevent the device driver from accessing the metadata memory unless the designated metadata value is present in designated metadata register.

As another example, the metadata driver may pass to the device driver a pointer to a location in the metadata memory to be written. The pointer may be associated with a designated metadata value (e.g., a designated pointer color) that allows access to the metadata memory location. For instance, a metadata memory policy may be provided to prevent access of the metadata memory location using a pointer that is not associated with the designated metadata value. When the device driver returns, the metadata driver may destroy the pointer, and/or remove the designated metadata value.

Illustrative configurations of various aspects of the present disclosure are provided below.

1. A computer-implemented method for on-demand loading of metadata, the method comprising acts of: receiving a page fault service request from an operating system kernel; causing at least one first physical page to be allocated in an application memory for a virtual address indicated in the page fault service request; and causing metadata to be loaded into at least one second physical page in a metadata memory, wherein: the at least one second physical page in the metadata memory corresponds to the at least one first physical page in the application memory; and the metadata loaded into the at least one second physical page corresponds to application data loaded into the at least one first physical page.

2. The method of configuration 1, wherein: the method is performed by a metadata driver executing in kernel mode; and the act of causing at least one first physical page to be allocated comprises delegating the page fault service request to a device driver associated with a file system.

3. The method of configuration 2, further comprising an act of: modifying at least one data structure maintained by the operating system kernel to redirect page fault service requests from the device driver to the metadata driver.

4. The method of configuration 3, wherein: the act of modifying at least one data structure comprises: identifying a virtual memory area data structure; identifying, in the virtual memory area data structure, a field comprising at least one first pointer to a fault handler provided by the device driver; and replacing the at least one first pointer to the fault handler provided by the device driver with at least one second pointer to a fault handler provided by the metadata driver.

5. The method of configuration 4, wherein: the metadata driver is called by an on-demand linker allocating one or more virtual memory areas for an ELF image; the on-demand linker passes to the metadata driver: (i) a virtual address to which one or more segments of the ELF image is mapped, and (ii) information regarding one or more locations in the ELF image where metadata corresponding to the one or more mapped segments is stored; the virtual address received from the on-demand linker is used to identify the virtual memory area data structure; and the metadata loaded into the at least one second physical page in the metadata memory comprises metadata read from the one or more locations in the ELF image.

6. The method of configuration 2, wherein: the act of causing metadata to be loaded comprises acts of: using a physical address of the at least one first physical page in the application memory to determine a physical address of the at least one second physical page in the metadata memory; and calling the device driver with the physical address of the at least one second physical page in the metadata memory.

7. The method of configuration 6, wherein: the at least one second physical page in the metadata memory is statically allocated for the physical address of the at least one first physical page in the application memory.

8. The method of configuration 2, wherein: the act of causing metadata to be loaded comprises an act of: providing the metadata to policy enforcement hardware; and the metadata is loaded into the at least one second physical page in the metadata memory by the policy enforcement hardware.

9. The method of configuration 1, wherein: the operating system kernel is subject to a waiver policy enforced by policy enforcement hardware.

10. A system comprising one or more circuitries and/or processors programmed by executable instructions, wherein the one or more circuitries and/or programmed processors are configured to perform any of the preceding configurations.

11. At least one computer-readable medium having stored thereon at least one netlist for the one or more circuitries of configuration 10.

12. At least one computer-readable medium having stored thereon at least one hardware description that, when synthesized, produces the netlist of configuration 11.

13. At least one computer-readable medium having stored thereon the executable instructions of configuration 10.

Figure 8:
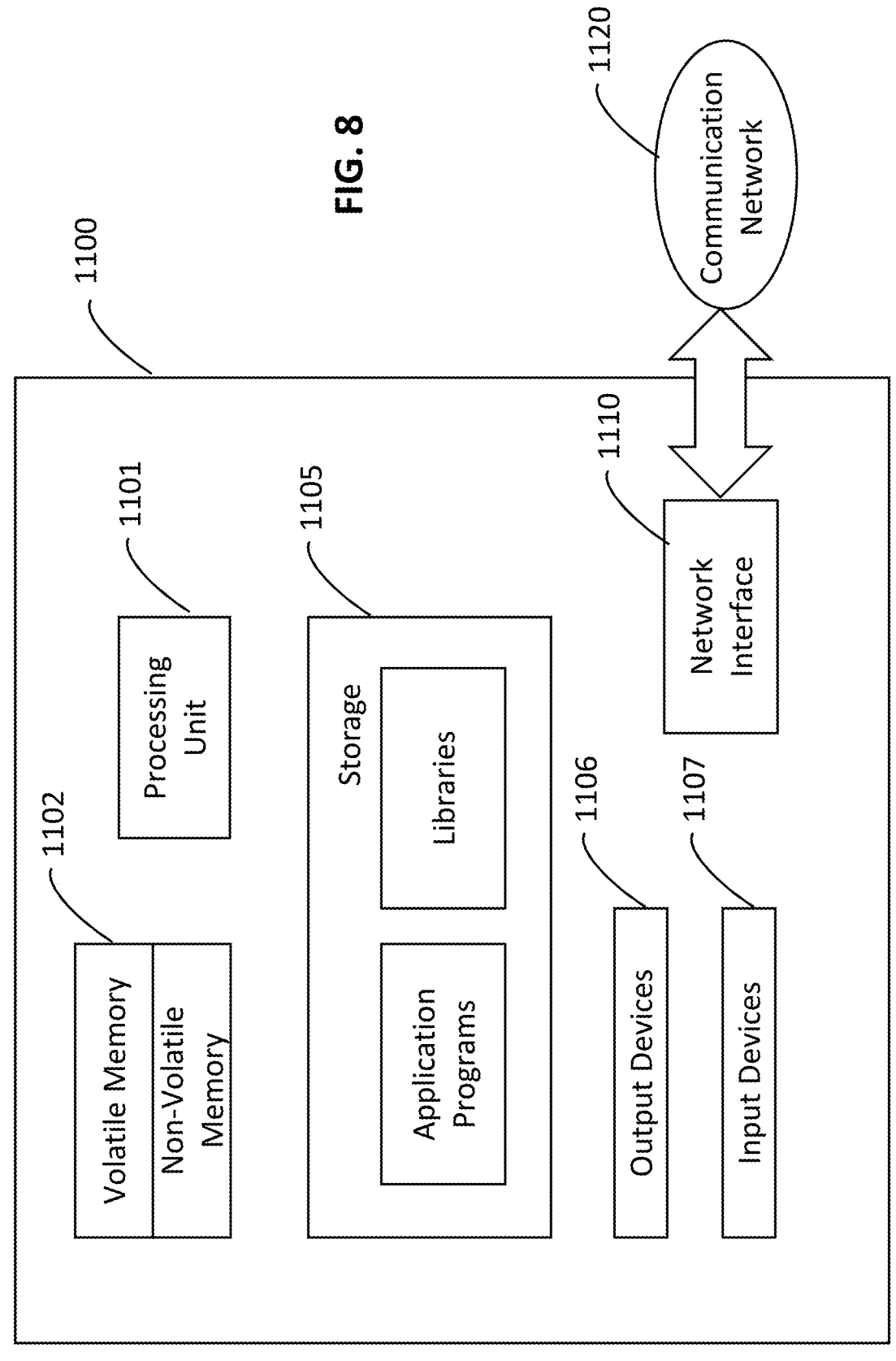
FIG. 8 shows, schematically, an illustrative computer 1100 on which any aspect of the present disclosure may be implemented.

FIG. 8 shows, schematically, an illustrative computer 1100 on which any aspect of the present disclosure may be implemented. In the example shown in FIG. 8, the computer 1100 includes a processing unit 1101 having one or more processors and a computer-readable storage medium 1102 that may include, for example, volatile and/or non-volatile memory. The memory 1102 may store one or more instructions to program the processing unit 1101 to perform any of the functions described herein. The computer 1100 may also include other types of computer-readable medium, such as storage 1105 (e.g., one or more disk drives) in addition to the system memory 1102. The storage 1105 may store one or more application programs and/or resources used by application programs (e.g., software libraries), which may be loaded into the memory 1102.

The computer 1100 may have one or more input devices and/or output devices, such as output devices 1106 and input devices 1107 illustrated in FIG. 8. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1107 may include a microphone for capturing audio signals, and the output devices 1106 may include a display screen for visually rendering, and/or a speaker for audibly rendering, recognized text.

In the example of FIG. 8, the computer 1100 may also include one or more network interfaces (e.g., network interface 1110) to enable communication via various networks (e.g., communication network 1120). Examples of networks include local area networks (e.g., an enterprise network), wide area networks (e.g., the Internet), etc. Such networks may be based on any suitable technology, and may operate according to any suitable protocol. For instance, such networks may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques described herein may be embodied as a non-transitory computer-readable medium (or multiple non-transitory computer-readable media) (e.g., a computer memory, one or more floppy discs, compact discs, optical discs, magnetic tapes, flash memories, circuit configurations in Field Programmable Gate Arrays or other semiconductor devices, or other tangible computer-readable media) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that how the data elements are related.

Various features and aspects of the present disclosure may be used alone, in any combination of two or more, or in a variety of arrangements not specifically described in the foregoing, and are therefore not limited to the details and arrangement of components set forth in the foregoing description or illustrated in the drawings. For example, aspects described in one embodiment may be combined in any manner with aspects described in other embodiments.

Also, the techniques described herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

The invention claimed is:

1. A computer-implemented method for on-demand loading of metadata, the method comprising acts of:
   receiving a page fault service request from an operating system kernel;
   causing at least one first physical page to be allocated in an application memory for a virtual address indicated in the page fault service request; and
   causing metadata to be loaded into at least one second physical page in a metadata memory, wherein:

the at least one second physical page in the metadata memory corresponds to the at least one first physical page in the application memory; and
   the metadata loaded into the at least one second physical page corresponds to application data loaded into the at least one first physical page.

2. The method of claim 1, wherein:
the method is performed by a metadata driver executing in kernel mode; and
the act of causing at least one first physical page to be allocated comprises delegating the page fault service request to a device driver associated with a file system.

3. The method of claim 2, further comprising an act of:
modifying at least one data structure maintained by the operating system kernel to redirect page fault service requests from the device driver to the metadata driver.

4. The method of claim 3, wherein:
the act of modifying at least one data structure comprises:
   identifying a virtual memory area data structure;
   identifying, in the virtual memory area data structure, a field comprising at least one first pointer to a fault handler provided by the device driver; and
   replacing the at least one first pointer to the fault handler provided by the device driver with at least one second pointer to a fault handler provided by the metadata driver.

5. The method of claim 4, wherein:
the metadata driver is called by an on-demand linker allocating one or more virtual memory areas for an ELF image;
the on-demand linker passes to the metadata driver: (i) a virtual address to which one or more segments of the ELF image is mapped, and (ii) information regarding one or more locations in the ELF image where metadata corresponding to the one or more mapped segments is stored;
the virtual address received from the on-demand linker is used to identify the virtual memory area data structure; and
the metadata loaded into the at least one second physical page in the metadata memory comprises metadata obtained from the one or more locations in the ELF image.

6. The method of claim 2, wherein:
the act of causing metadata to be loaded comprises acts of:
   using a first physical address of the at least one first physical page in the application memory to determine a second physical address of the at least one second physical page in the metadata memory; and
   calling the device driver with the second physical address of the at least one second physical page in the metadata memory.

7. The method of claim 6, wherein:
the at least one second physical page in the metadata memory is statically allocated for the first physical address of the at least one first physical page in the application memory.

8. The method of claim 2, wherein:
the act of causing metadata to be loaded comprises an act of:
   providing the metadata to policy enforcement hardware; and
the metadata is loaded into the at least one second physical page in the metadata memory by the policy enforcement hardware.

9. The method of claim 1, wherein:

the operating system kernel is subject to a waiver policy enforced by policy enforcement hardware.

10. A system comprising one or more circuitries and/or one or more processors programmed by executable instructions, wherein the one or more circuitries and/or the one or more programmed processors are configured to;

receive a page fault service request from an operating system kernel;

cause at least one first physical page to be allocated in an application memory for a virtual address indicated in the page fault service request; and cause metadata to be loaded into at least one second physical page in a metadata memory, wherein:

the at least one second physical page in the metadata memory corresponds to the at least one first physical page in the application memory; and the metadata loaded into the at least one second physical page corresponds to application data loaded into the at least one first physical page.

11. The system of claim 10, wherein:

the one or more circuitries and/or the one or more programmed processors are configured to execute a metadata driver in kernel mode; and the metadata driver is configured to cause at least one first physical page to be allocated at least in part by delegating the page fault service request to a device driver associated with a file system.

12. The system of claim 11, wherein the one or more circuitries and/or the one or more programmed processors are further configured to:

modify at least one data structure maintained by the operating system kernel to redirect page fault service requests from the device driver to the metadata driver.

13. The system of claim 12, wherein:

the one or more circuitries and/or the one or more programmed processors are configured to modify at least one data structure at least in part by:

identifying a virtual memory area data structure;

identifying, in the virtual memory area data structure, a field comprising at least one first pointer to a fault handler provided by the device driver; and replacing the at least one first pointer to the fault handler provided by the device driver with at least one second pointer to a fault handler provided by the metadata driver.

14. The system of claim 13, wherein:

the metadata driver is called by an on-demand linker allocating one or more virtual memory areas for an ELF image;

the on-demand linker passes to the metadata driver: (i) a virtual address to which one or more segments of the ELF image is mapped, and (ii) information regarding one or more locations in the ELF image where metadata corresponding to the one or more mapped segments is stored;

the virtual address received from the on-demand linker is used to identify the virtual memory area data structure; and the metadata loaded into the at least one second physical page in the metadata memory comprises metadata obtained from the one or more locations in the ELF image.

15. The system of claim 11, wherein:

the one or more circuitries and/or the one or more programmed processors are configured to cause metadata to be loaded at least in part by:

using a first physical address of the at least one first physical page in the application memory to determine a second physical address of the at least one second physical page in the metadata memory; and calling the device driver with the second physical address of the at least one second physical page in the metadata memory.

16. The system of claim 15, wherein:

the at least one second physical page in the metadata memory is statically allocated for the first physical address of the at least one first physical page in the application memory.

17. The system of claim 11, wherein:

the one or more circuitries and/or the one or more programmed processors are configured to cause metadata to be loaded at least in part by:

providing the metadata to policy enforcement hardware; and the metadata is loaded into the at least one second physical page in the metadata memory by the policy enforcement hardware.

18. The system of claim 10, wherein:

the operating system kernel is subject to a waiver policy enforced by policy enforcement hardware.

19. At least one non-transitory computer-readable medium having stored thereon at least one hardware description for one or more circuitries and/or executable instructions for programming one or more processors, wherein the one or more circuitries and/or the one or more programmed processors are configured to: receive a page fault service request from an operating system kernel; cause at least one first physical page to be allocated in an application memory for a virtual address indicated in the page fault service request; and cause metadata to be loaded into at least one second physical page in a metadata memory, wherein: the at least one second physical page in the metadata memory corresponds to the at least one first physical page in the application memory; and the metadata loaded into the at least one second physical page corresponds to application data loaded into the at least one first physical page.

* * * * *